May 22, 1923.
O. HOFFMAN
THRASHING MACHINE ATTACHMENT
Filed Oct. 16, 1922
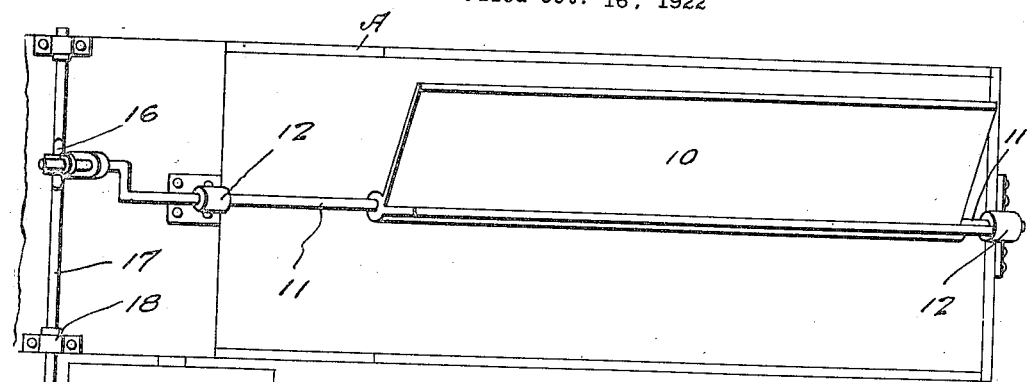
Fig. 1.
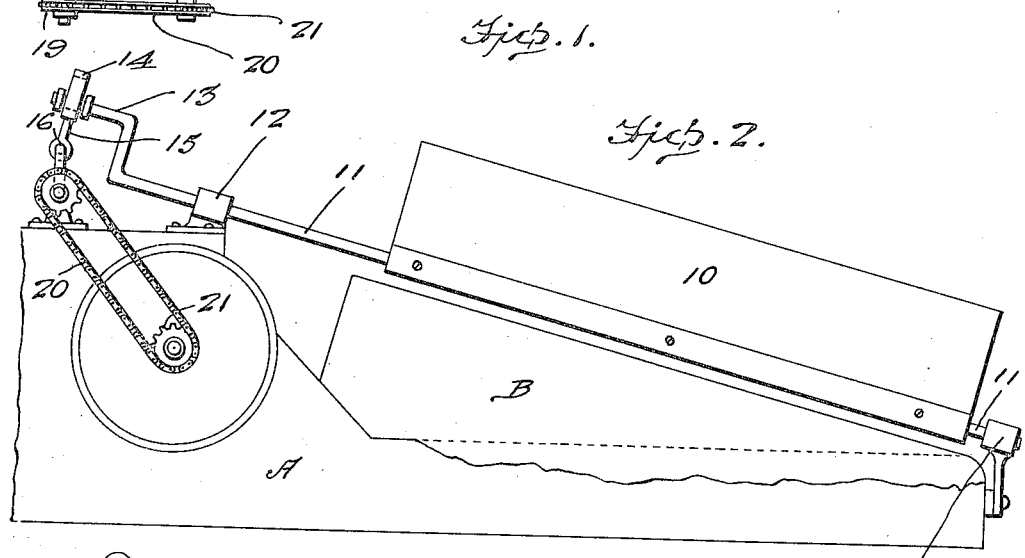
Fig. 2.
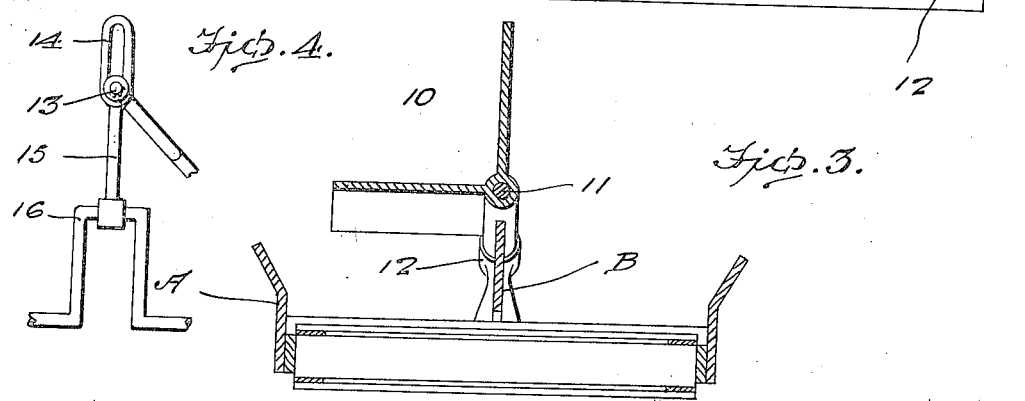
Fig. 4.
Fig. 3.
Orville Hoffman
INVENTOR
BY Victor J. Evans
ATTORNEY
WITNESS:

Patented May 22, 1923.

1,456,441

UNITED STATES PATENT OFFICE.

ORVILLE HOFFMAN, OF MODOC, ILLINOIS.

THRASHING-MACHINE ATTACHMENT.

Application filed October 16, 1922. Serial No. 594,881.

*To all whom it may concern:*

Be it known that I, ORVILLE HOFFMAN, a citizen of the United States, residing at Modoc, in the county of Randolph and State of Illinois, have invented new and useful Improvements in Thrashing-Machine Attachments, of which the following is a specification.

This invention relates to thrashing machines, particularly to the self feeders thereof, and has for its object the provision of a novel attachment which will operate to prevent more than one bundle at a time from passing to the cylinder. It is well known that if two or more bundles pass to the thresher cylinder side by side a great loss of grain results and in addition to this defect unsteady running of the machine is caused.

It is with these facts in view that I have designed the present device which has for its object the provision of a V-shaped trough located above the dividing board of the feeder and rocked back and forth so that as the bundles are thrown by the pitchers the alternate bundles will be fed into opposite sides of the feeder.

An additional object is the provision of a device of this character which will be simple and inexpensive in manufacture, easy to install, positive and automatic in operation, durable in service and a general improvement in the art.

With the above and other objects and advantages in view the invention consists in the details of construction to be hereinafter more fully described and claimed and illustrated in the accompanying drawings, in which:

Figure 1 is a plan view of a portion of a feeder showing my device in applied position, Figure 2 is a side elevation with parts broken away, Figure 3 is a cross section, Figure 4 is a fragmentary elevation at right angles to Figure 2.

Referring more particularly to the drawings the letter A designates a portion of the feeder frame of a thrashing machine and B represents the dividing board thereof.

In carrying out my invention I provide an elongated trough 10 which is V-shaped in cross section and which is mounted to extend longitudinally along and above the dividing board. This trough member is carried by a shaft 11 which is journaled in suitable bearings 12 and which has one end formed with a crank 13 engaging within a loop 14 carried by a connecting rod 15 engaged upon the crank 16 of a crank shaft 17 which is journaled in bearings 18 and which is provided with a sprocket 19 driven by a chain 20 from a sprocket 21 mounted on a shaft driven by some convenient portion of the mechanism of the thresher.

In the operation it will be seen that while the thresher is in operation the trough will be rocked back and forth so as to close the compartments at the sides of the dividing board alternately so that as the bundles of grain are thrown onto or into the feeder they will be disposed alternately at opposite sides of the dividing board. The advantage of this arrangement is that jambing of the bundles in the feeder will be prevented so that the feeding to the thresher will be more uniform and so waste of grain will be prevented. At every stroke or movement of the trough, there will be a pause followed by a quick return. The pause gives time for the pitchers to throw the bundles properly in position.

From the foregoing description and a study of the drawings it is apparent that I have thus provided a simply constructed and consequently inexpensive device for the purpose specified which will operate very effectually and which will perform all the functions for which it is intended. Owing to the simplicity of the construction and the fewness of the parts it is apparent that there is nothing to get out of order and that the device should have a long life.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a thrashing machine feeder, a frame with a dividing board therein forming compartments on opposite sides thereof, in combination with an oscillating trough pivotally mounted above and in line with said dividng board, and mechanism connected with said trough and frame for oscillating said trough so as to alternately cover or uncover said compartments.

In testimony whereof I affix my signature.

ORVILLE HOFFMAN.